(12) United States Patent
Geissler et al.

(10) Patent No.: US 7,250,024 B2
(45) Date of Patent: Jul. 31, 2007

(54) TOOL SHELF MAGAZINE

(75) Inventors: Alfred Geissler, Pfronten (DE); Hans Gronbach, Eisenberg (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 369 days.

(21) Appl. No.: 10/898,492

(22) Filed: Jul. 22, 2004

(65) Prior Publication Data
US 2005/0026758 A1  Feb. 3, 2005

(30) Foreign Application Priority Data
Jul. 28, 2003  (DE) ................. 103 34 346

(51) Int. Cl.
  *B23Q 3/157* (2006.01)
  *B23Q 13/00* (2006.01)
(52) U.S. Cl. .............. 483/49; 483/39; 483/53; 483/51; 483/62; 483/61; 483/66; 483/67; 211/1.53; 211/1.55; 211/70.6
(58) Field of Classification Search ............ 483/40, 483/41, 48, 44–46, 49, 51, 53, 58, 60–64, 483/66–67; 211/1.54, 1.53, 1.55, 70.6, 69
See application file for complete search history.

(56) References Cited

U.S. PATENT DOCUMENTS

| | | | | |
|---|---|---|---|---|
| 3,312,370 A | * | 4/1967 | Kolarich et al. | 483/63 |
| 3,339,273 A | * | 9/1967 | Knosp | 483/8 |
| 3,355,798 A | * | 12/1967 | Drechsler | 483/63 |
| 3,449,822 A | * | 6/1969 | Jacob, Jr. et al. | 483/8 |
| 4,622,734 A | * | 11/1986 | Kolblin et al. | 483/32 |
| 4,833,770 A | * | 5/1989 | Esser et al. | 483/41 |
| 4,920,631 A | * | 5/1990 | Novak | 483/61 |
| 5,107,581 A | * | 4/1992 | Reuter et al. | 483/61 |
| 5,281,194 A | * | 1/1994 | Schneider | 483/14 |
| 6,228,006 B1 | * | 5/2001 | Horn et al. | 483/55 |
| 6,494,821 B1 | * | 12/2002 | Patel et al. | 483/49 |

FOREIGN PATENT DOCUMENTS

| | | |
|---|---|---|
| DE | 38 16 861 A1 | 12/1988 |
| DE | 39 25 567 C2 | 2/1991 |
| DE | 195 10 498 A1 | 9/1996 |
| DE | 100 20 801 A1 | 11/2001 |
| EP | 0 319 914 B1 | 6/1989 |

* cited by examiner

*Primary Examiner*—Erica Cadugan
(74) *Attorney, Agent, or Firm*—The Maxham Firm

(57) ABSTRACT

A tool shelf magazine for milling and drilling machines has at least one shelf, a plurality of compartments provided in the shelf above each other at predetermined intervals and also a plurality of notches, which are open on one side accommodating one suspended tool. A handling device is vertically and horizontally shiftable by means of a motor located adjacent to the shelf. At least one gripper arrangement is provided for extracting predetermined tools from the shelf and for transferring them to a tool changer. At least one shelf has compartments with notches serving as tool accommodations on the front and back side. The notches on the front side are located in the access range of the handling device and the notches on the back side are accessible for retooling. The shelf is formed so as to be rotatable about an axis for a change of sides.

4 Claims, 2 Drawing Sheets

TOOL SHELF MAGAZINE

BACKGROUND OF THE INVENTION

1. Field of the Invention

The present invention relates generally to machine tools, and more specifically to a tool shelf magazine, particularly for machine tools or machining centers, for example.

2. Discussion of Related Art

Various tool shelf magazines are known and are preferably used for complex machine tools, such as machining centers and eroding equipment, all of which are capable of carrying out a multitude of different machining processes using different tools. Conventional shelf magazines have a shelf positioned adjacent to the machine tool and a plurality of compartments disposed above each other in predetermined intervals. A plurality of approximately semicircular notches are formed in each compartment and are open on the machine side. Various tools are inserted into the machine side with their tool tapers. A handling system is provided laterally on or adjacent to the shelf. The handling system has a support column shiftable on horizontal rails and a gripper arrangement vertically shiftable on the support column. A movable tool gripper is provided for extracting a specified tool from the magazine and for transporting the tool to a transfer position in which the tool is either directly inserted into the work spindle according to the pick-up principle or transferred to a tool changer. Such shelf magazines having a handling system are known, for example, from European patent 0 319 914 B and German patent publication 100 20 801 A.

German patent publication 39 25 567 A describes a plurality of magazine shelves disposed adjacent to the machine tool on one side and two compartments having a number of tool accommodations. The magazine shelves are individually movable on lateral support rails from a rear stand-by position to a front position, where the individual tools can be taken up by a gripper arrangement that is shiftable on a rigid support frame. The tools can then be inserted into a vertical spindle or a horizontal spindle of the machining center. However, such a tool storage and handling system is relatively complex and requires a greater amount of space adjacent to the machine tool.

SUMMARY OF THE INVENTION

The tool shelf magazine herein has at least one shelf, and a plurality of compartments are provided in the shelf on top of each other in predetermined intervals. It also has, on one longitudinal side, a plurality of notches, which are open on one side and serve as support for one tool. A handling device is also provided which is vertically and horizontally shiftable by means of a motor disposed on one longitudinal side of the shelf. The handling device includes at least one gripper for extracting specified tools from the shelf and for transferring the respective tool to a tool changer. The invention further relates to a method for handling tools using a shelf magazine and a handling device.

It is a purpose of the invention to provide a tool shelf magazine including a handling device which has an increased storage capacity as compared to known shelf magazines and enables considerably enhanced tooling and handling of the tools.

According to the invention this purpose is achieved by providing compartments with notches serving as tool accommodations on the front and back sides in at least one shelf. The notches on the front side are located in the access range of the handling device. The notches on the back side are accessible for tooling. The shelf is capable of a change of sides.

One advantage lies in the doubling of storage capacity as compared to conventional tool shelves having similiar dimensions. The invention is capable of exchanging the tools on the outer side of the shelf without the necessity for interrupting the operation of the machine tool and the handling system. Only for the brief change of sides the handling device has to be moved into a position in which a change of sides of the magazine or the magazine compartments can be carried out without interference.

A particularly advantageous aspect of the invention is that the tool shelf is capable of a side change in a segment of a stationary wall shelf. In this case the bilaterally shiftable shelf should be rotatable about a vertical axis by at least 180° so that the change of sides is effected by a rotation of the shelf. The tools located in the access range of the handling device until then are moved to the outer side and the newly inserted tools located on the outer side until then are moved into the access range of the handling device. This combination of a tool shelf toolable from both sides and at least one stationary wall shelf enables a continuous long-term operation of the machine tool. The handling device achieves a double function in that it extracts tools from the tool changer or directly from the work spindle and inserts them into predetermined tool accommodations in the wall magazine in the conventional way. For example, used or partly worn tools are extracted from their predetermined accommodations in the wall magazine by the handling device and inserted into the empty accommodations of the bilaterally toolable tool magazine. These operations are suitably carried out by the handling device during longer machining periods without a tool exchange. In another operation, the handling device may extract new tools from the bilaterally toolable magazine and insert them into corresponding accommodations in the wall magazine so that these tools are available in the wall magazine for one of the following machining processes. If the bilaterally toolable tool magazine is tooled with a sufficient number of used tools, a change of sides is effected so that the new tools located on the outer side so far will now be located on the inner side and within the access range of the handling device. The used tools then located at the outer side are now freely accessible and can be taken out of their accommodations and replaced by new tools without any risk and without any interference with the operations carried out by the machine.

One embodiment of the shelf magazine according to the invention advantageously has a considerably higher storage capacity. The tool exchange processes are carried out in the manner described above, and the device has two shelves provided adjacent to the machine tool and adjacent to each other at a predetermined distance. The shelf on the outer side has at least one segment that is rotatable about its vertical center axis. The handling device is disposed in the space between the two shelves. The shelf on the machine side has notches that serve as tool accommodations and face the handling device. It also has a through hole for a tool transfer between the handling device and a tool exchanger. Since the wall shelf on the outer side comprising the shelf segment that is rotatable about the vertical center axis, as well as the shelf on the side of the machine are handled by the one centrally disposed handling device, in such a shelf magazine the at least one gripper is rotatably hinged to the end of a swivel arm. The handling device comprises a kinematic rotation compensation means compensating a rotation of the respective tool during a transfer operation so that each tool will retain its angular position in its magazine location from the extraction by the gripper to the transfer to the tool changer. With this rotation, compensation errors and failures during the transfer operations and the insertion into the respective work spindle of the machine are avoided. The kinematic rotation compensation means further enables a narrow moving path for the handling device. In other words, there is a short distance between the shelves since the tools are transported and transferred without being rotated.

A further object of the invention is to provide a method for handling tools using a shelf magazine and a handling device. According to this method, the tools required, which depend on the machining schedule of the machine tool, are extracted from the respective tool accommodations of the shelf magazine by the handling device. They are transferred to a tool changer after the handling device has been moved into a transfer position, and vice versa. The used tools, which are accessible from outside, are taken out of the tool accommodations and new tools are inserted into those tool accommodations in at least one shelf segment during the operation of the machine tool. The newly inserted tools are then moved into the access range of the handling device by moving the shelf segment. The handling device extracts used tools from the remaining shelf and inserts them into empty spaces in the shelf segment. The new tools are extracted from the shelf segment and they are inserted into empty spaces in the remaining shelf during the operation.

BRIEF DESCRIPTION OF THE DRAWING

Further particularities and advantages of the invention will become clear from the following description of preferred embodiments, with reference to the drawing, in which.

DETAILED DESCRIPTION OF THE PREFERRED EMBODIMENTS

Figure 1:
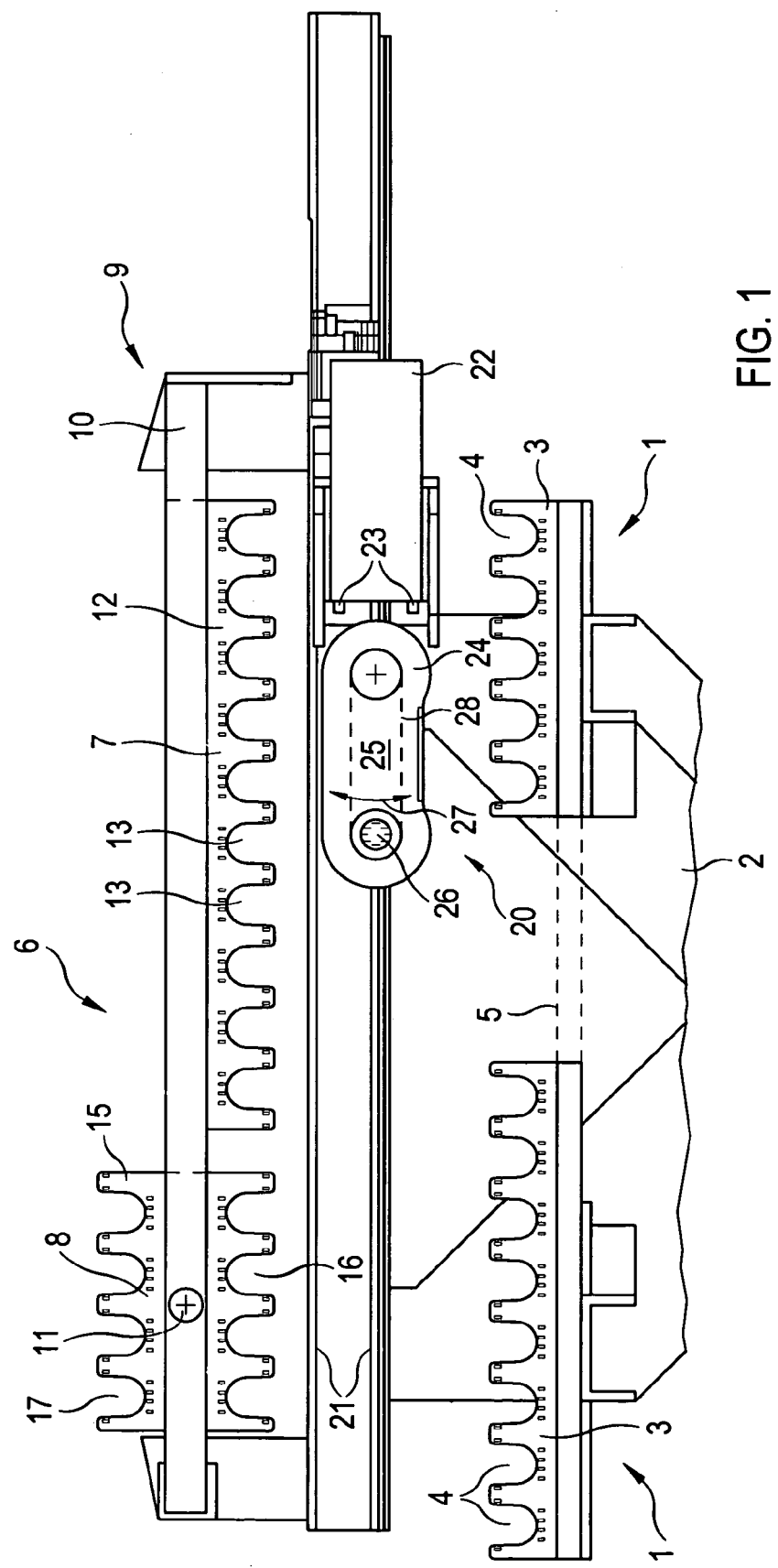
FIG. 1 is a schematic plan view of a shelf magazine having wall shelves and a turnable shelf segment, as well as a central handling device, according to one embodiment of the invention.

The tool shelf magazine shown in FIG. 1 is configured for a program controlled milling and drilling machine with a tool changer. The tool changer provides means by which the tools are extracted from and inserted into the work spindle of a horizontal or vertical milling head in accordance with a particular machining schedule. The shelf magazine consists of stationary shelf 1 on the machine side fixedly mounted to bed 2. A plurality of compartments 3 are disposed above each other in predetermined intervals, only one of said compartments being visible in the plan view of FIG. 1. In each compartment 3, a plurality of approximately semicircular notches 4 are provided which are open on the upper side, as shown in FIG. 1. The notches serve as accommodations for the tool cones of the respective tools. In its central section the stationary shelf comprises through hole 5 for the tool transfer.

The shown tool shelf magazine contains rear shelf 6 made up of stationary wall shelf 7, as well as its continuation, shelf segment 8. Wall shelf 7 and shelf segment 8 are disposed in frame construction 9, the upper longitudinal beam 10 of which extends across the full length of shelf 6. Shelf segment 8 is rotatable about its vertical center axis in rotary bearings 11 in the frame construction. Wall shelf 7 contains a plurality of compartments 12 disposed above each other at predetermined intervals, only one of said compartments 12 being shown in the view of FIG. 1. Each compartment 12 of wall magazine 7 comprises a number of approximately semicircular notches 13 that are open on the lower side as seen in FIG. 1. These notches serve as accommodations for the tool cones of the tools and correspond to notches 4 in shelf 1 with respect to arrangement and function.

Shelf segment 8 also comprises compartments 15 disposed above each other, These compartments have a plurality of notches 16, 17 in both longitudinal sides. Notches 16, shown on the lower side in FIG. 1, correspond to notches 13 in stationary wall shelf 7 with respect to position and orientation. Notches 17, shown on the upper side in FIG. 1, provided in each compartment 15 of shelf segment 8, are freely accessible so that used tools may be extracted and new tools may be inserted at any time. In the embodiment shown, shelf segment 8 is symmetrical so that the side change of the compartments is effected by rotating shelf segment 8 by 180° about its vertical axis 11. In other words, notches 16, which are open on the lower side in FIG. 1, are moved to the upper side and notches 17 which are open on the upper side in FIG. 1, are moved to the lower side.

Figure 2:
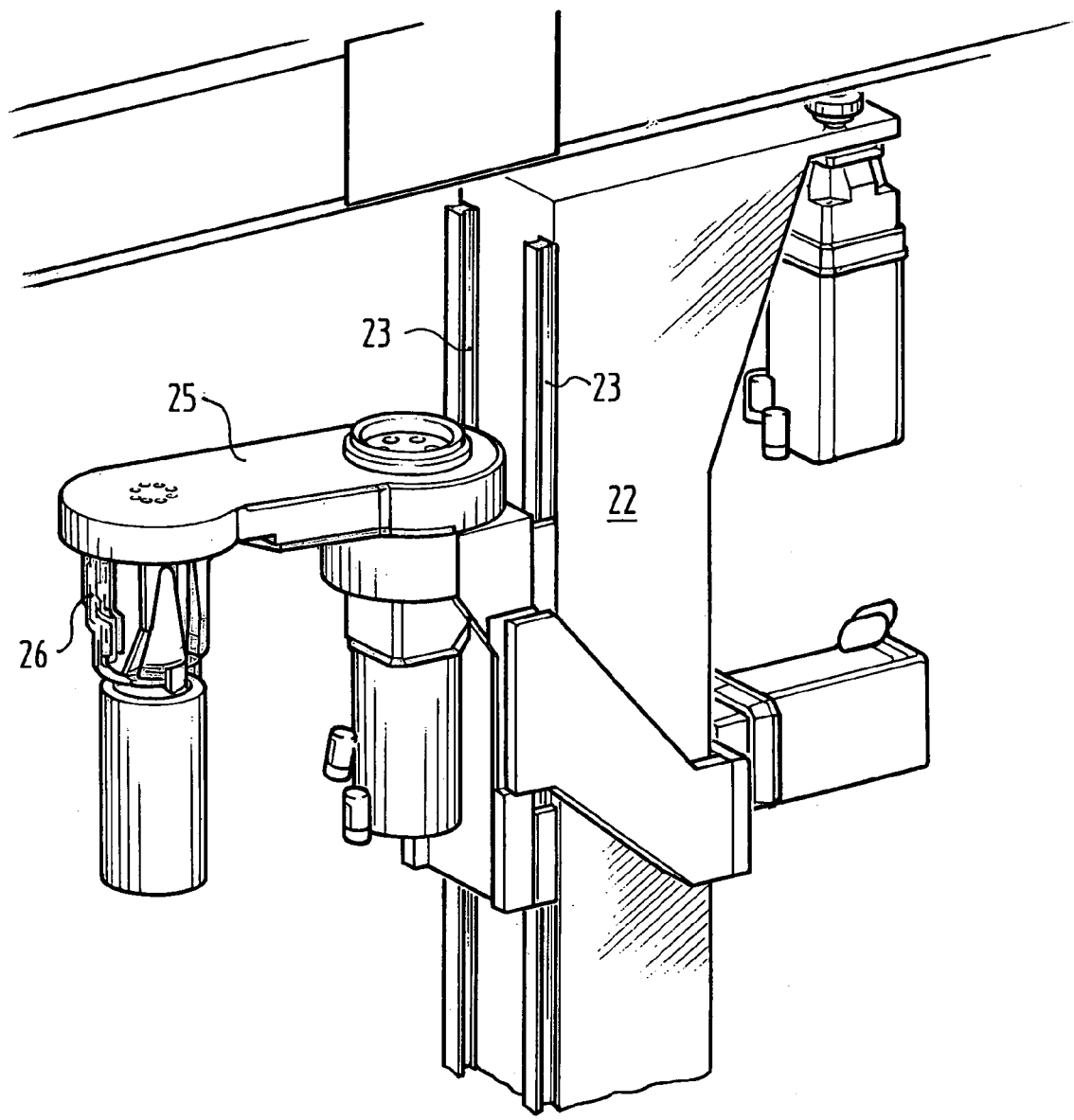
FIG. 2 is an enlarged perspective view of the handling device according to one embodiment of the invention.

Shown in detail in FIG. 2 in the space between two shelves 1 and 6 is handling device 20 which is movable on ground rails 21. Rigid vertical column 22 is horizontally shiftable on ground rails 21 by means of a motor (not shown). Gripper arrangement 24 is shiftable on vertical guide rails 23 by means of a motor (not shown) on the face of column 22. Gripper arrangement 24 (FIG. 1) includes swivel arm 25 on the free end of which is disposed gripper 26. Swivel arm 25 can carry out swinging movements in the direction of double arrow 27 so that its gripper 26 can extract and insert tools from and into notches 4 of the machine side shelf 1, as well as into and from notches 13, 16 of tool shelf 6. Due to the special kinematics of the gripper arrangement which is, for example, formed as continuous toothed belt 28, the angular posture of the respective tool remains unchanged even after the extraction by gripper 26 and the transfer through opening 5. The respectively taken up tool will not be rotated during the different movements of the gripper.

The operation of the shelf magazine is now described. A tool changer (not shown in FIG. 1) moves a used tool extracted from the work spindle into a transfer position in front of through hole 5. Using a combined horizontally and vertically controlled movement of handling device 20, gripper arrangement 24 is moved into a specified position in which gripper 26 is moved into the transfer position by a swiveling movement of swivel arm 25 and extracts the used tool from the tool changer. By swiveling swivel arm 25 back into the shown central position, handling device 20 can be moved into a position from which, in accordance with the schedule, the used tool can be inserted into a predetermined empty space in one of magazines 1 or 6 without its angular posture being changed by the swiveling movement of swivel arm 25. By providing shelf segment 8 rotatable about its vertical axis 11, handling device 20 provides an additional function in that tools may be exchanged between shelf segment 8 and stationary wall shelves 1, 6, while the machine carries out a machining operation, thereby enabling a continuous machine operation. For example, worn tools may be extracted from one of compartments 3, 12 and inserted into an empty notch 16 of one of compartments 15 by the handling device. If a sufficient number of worn tools are accommodated in notches 16 of compartments 15 of shelf segment 8 and, at the same time, notches 17 on the outer side of compartments 15 are tooled with new selected tools, a side change is carried out by rotation of shelf segment 8 about vertical axis 11. Then the new tools are located in the access area of handling device 20, and worn tools then located on the outer side may be taken from the notches at any time. Handling device 20 extracts the respective tools from the compartments which are then on the inner side and inserts them into predetermined notches of compartments 3, 12 of the stationary magazines. They can then be transferred to the tool changer by handling device 20 in the manner described above when needed. Due to the virtually continuous opportunity to exchange the tools, the respective machine tool can be continuously operated without interruptions and with any number of different tools.

The invention is not limited to the embodiment described above and shown in the figures. Instead of the two shown wall shelves 1 and 7, for example, just a single wall shelf may be used together with the shelf segment 8 rotatable about its vertical axis. Further a plurality of shelf segments respectively rotatable about their vertical axes may be provided adjacent to each other in the frame construction 9 in combination with a stationary wall shelf or without such a wall shelf.

The invention is to be construed only in accordance with the appended claims and equivalents.

What is claimed is:

1. A tool shelf magazine for milling and drilling machine tools having a tool changer, said tool shelf magazine comprising:
   at least one shelf, said at least one shelf having a non-rotatable segment and a rotatable segment, said rotatable segment being rotatable about a vertical axis;
   a plurality of compartments provided in said at least one shelf above each other at predetermined intervals, said compartments on said non-rotatable segment comprising a plurality of notches which are open on one side and which each serve as accommodations for a suspended tool, said compartments on said rotatable segment comprising a plurality of notches which are open on two opposite sides and which each serve as accommodations for a suspended tool; and
   a handling device which is vertically and horizontally shiftable with respect to said at least one shelf, said handling device being located adjacent to said at least one shelf and comprising at least one gripper arrangement configured to transfer a predetermined tool between said non-rotatable segment of said at least one shelf and the tool changer in the machine tool, and to transfer predetermined tools between said non-rotatable segment and said rotatable segment.

2. The shelf magazine according to claim 1, wherein said at least one shelf comprises two shelves provided adjacent to each other at a predetermined distance next to the machine tool, wherein one of said shelves is on the side of each of said compartments, spaced from the machine tool, wherein said handling device is located in the space between the two shelves and is configured to handle tools from both shelves, and wherein the other of said shelves is on a side next to the machine tool and is provided with a through hole for transferring the tools from the handling device to the tool changer, and from the tool changer to the handling device.

3. The shelf magazine according to claim 2, wherein said at least one gripper arrangement comprises a gripper and is rotatably hinged to the end of a swivel arm, the gripper being provided for gripping a tool from said compartments.

4. The shelf magazine according to claim 1, wherein said at least one gripper arrangement comprises a gripper and is rotatably hinged to the end of a swivel arm, the gripper being provided for gripping a tool from said compartments.

\* \* \* \* \*